March 8, 1966     M. DAVIS ETAL     3,239,215

DOCUMENT FEED MECHANISM

Filed Sept. 3, 1963     4 Sheets-Sheet 1

INVENTORS
MILES DAVIS
JOHN W. WAGNER
BY

ATTORNEY

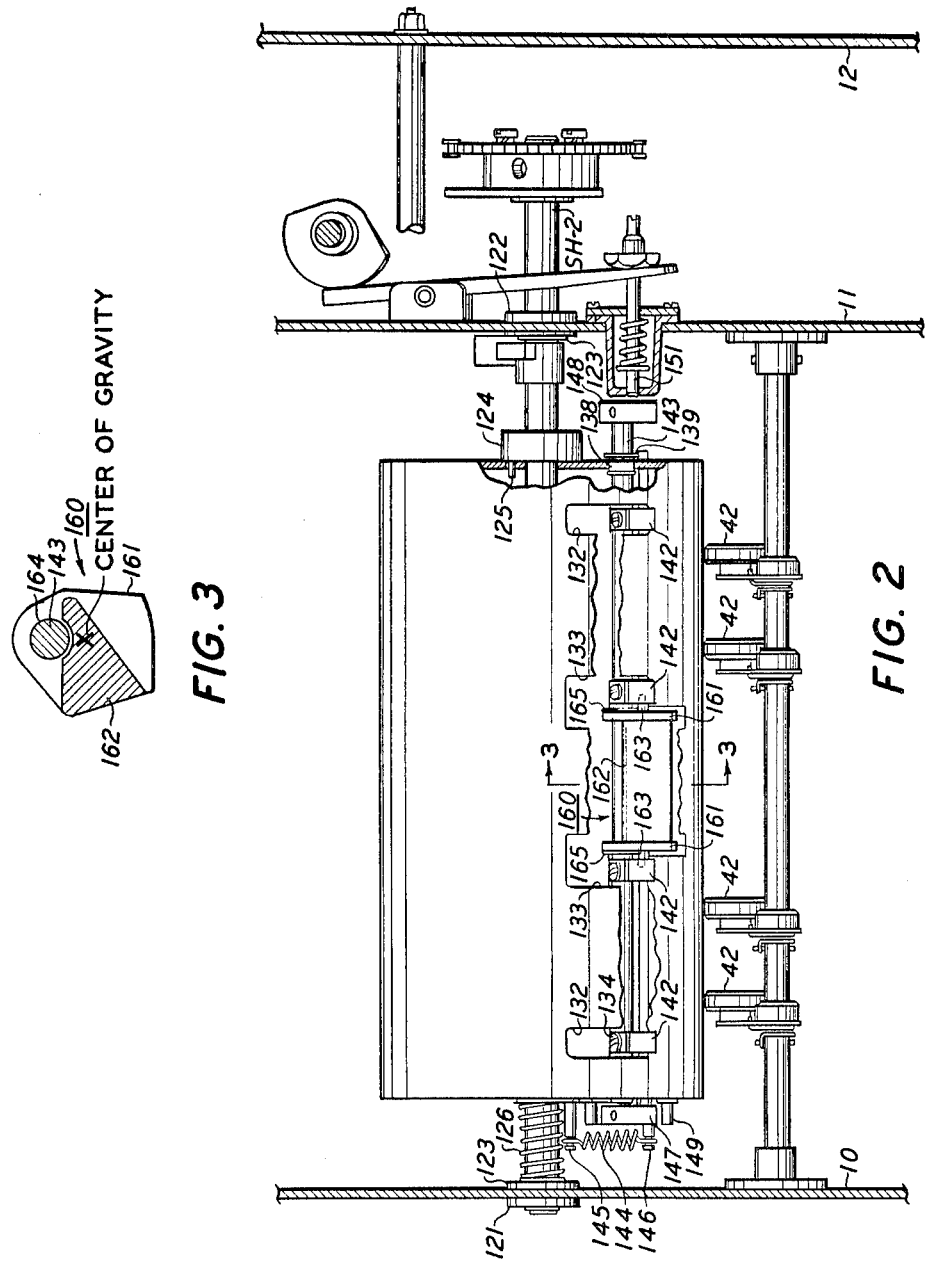

INVENTORS
MILES DAVIS
JOHN W. WAGNER
ATTORNEY

INVENTORS
MILES DAVIS
JOHN W. WAGNER
ATTORNEY

United States Patent Office 3,239,215
Patented Mar. 8, 1966

3,239,215
DOCUMENT FEED MECHANISM
Miles Davis, Rochester, and John W. Wagner, Penfield, N.Y., assignors to Xerox Corporation, Rochester, N.Y., a corporation of New York
Filed Sept. 3, 1963, Ser. No. 305,932
4 Claims. (Cl. 271—51)

This invention relates to a xerographic reproducing apparatus and, in particular, to a document feed mechanism for transporting a document or original to be reproduced.

Specifically, the invention relates to an improved document feed mechanism including a copy drum having clamping means or grippers by which a document may be releasably secured on the copy drum so as to be carried around thereby and so as to be released from the copy drum when desired, and a document stripper device adapted to release a document from the copy drum.

Both in the printing art and in the document reproducing art, various devices have been designed and constructed by means of which thin flexible sheets, such as documents or sheets of paper, are carried in a circular path by means of a blanket cylinder, or copy drum. Also in these machines, various devices, such as grippers, have been used to permit the releasable retention of a flexible sheet onto the drum or cylinder and to permit the release of these sheets from the drum or cylinder when desired.

However, it has been found that sheets will sometimes continue to adhere to the blanket cylinder or copy drum even after release by the grippers because of static electricity or other causes.

It is, therefore, the principal object of this invention to improve document feed mechanism whereby a document may be releasably secured in position on a rotating copy drum so as to be carried around thereby and so as to be released from the drum when desired without the necessity of stopping the copy drum.

Another object of the invention is to improve document feed mechanism whereby a document will be automatically stripped from a copy drum for discharge from the machine.

For a better understanding of the invention as well as other objects and further features thereof, reference is had to the following detailed description of the invention to be read in connection with the accompanying drawings, wherein:

FIG. 2 is a front sectional view of the copy drum of the apparatus of FIG. 1 with elements normally positioned in the foreground and background removed;

FIG. 3 is a sectional view taken along line 3—3 of FIG. 2;

Figure 5:
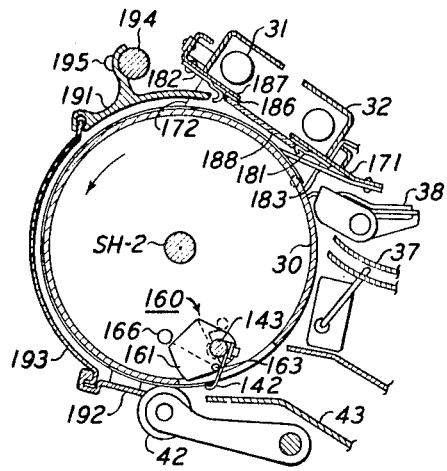
FIG. 5 is a sectional view of the copy drum.
Figure 6:
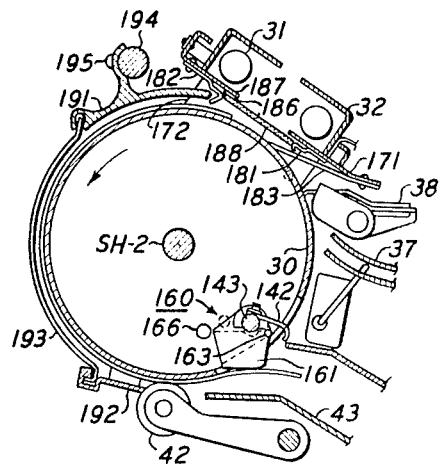
Figure 7:
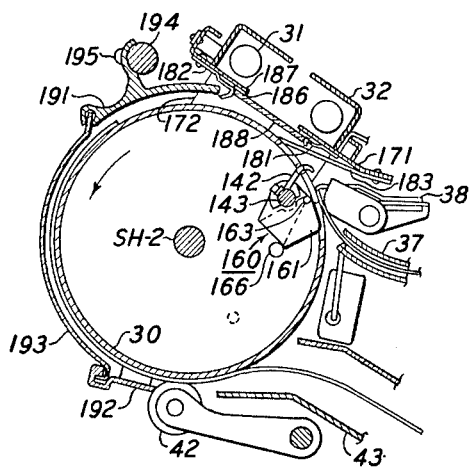
Figure 8:
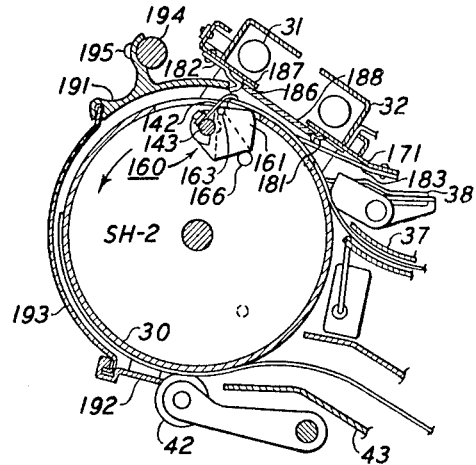

FIGS. 6, 7, and 8 are views similar to FIG. 5 showing the position of the various elements of the copy drum and elements associated therewith during different rotative positions of the copy drum.

Figure 1:
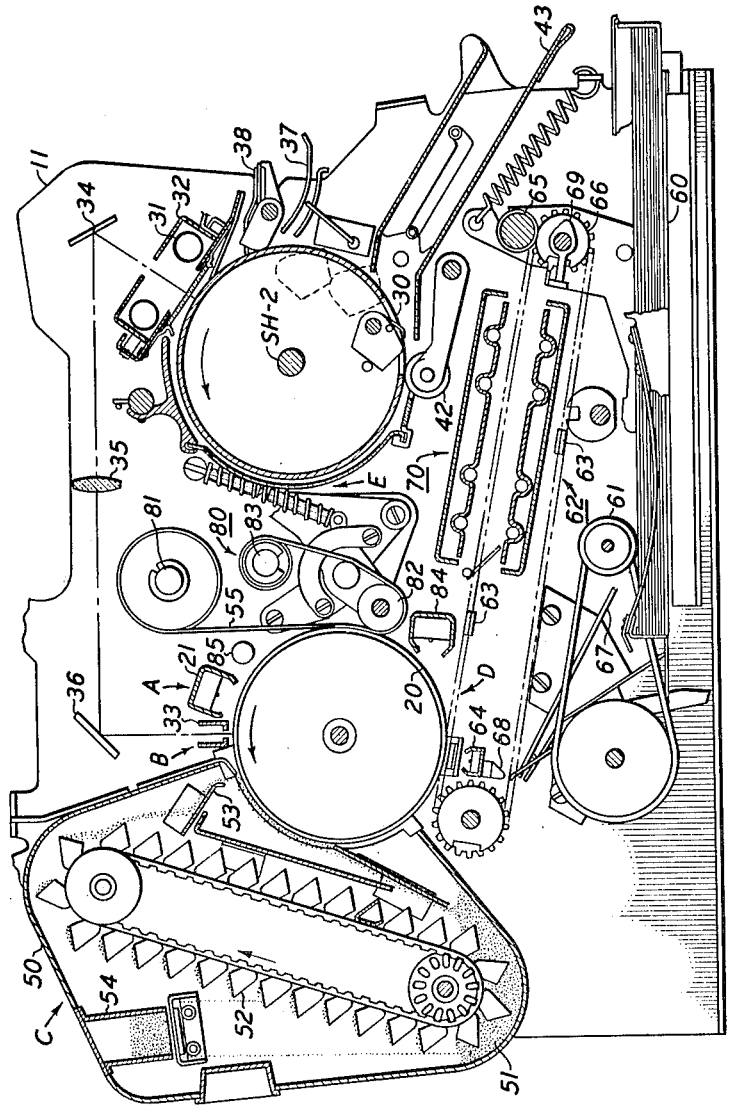
FIG. 1 is a schematic illustration of the apparatus of the invention.

Referring now to the drawings, there is shown schematically in FIG. 1 a xerographic reproducing apparatus used for producing xerographic reproductions from a moving original.

The xerographic reproducing apparatus is adapted for installation within a suitable light-tight housing or cabinet of a size so that the entire unit may be mounted on an office desk or table.

*General*

As shown, the xerographic apparatus comprises a xerographic plate including a photoconductive layer or light-receiving surface on a conductive backing and formed in the shape of a drum, generally designated by numeral 20, which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning station, at which the drum surface is first charged and then brushed or wiped to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A in the schematic illustration of the apparatus. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system, or the like, designed to project a line copy image onto the surface of the photoconductive xerographic drum from a suitable original.

The optical scanning or projection assembly consists of a copyboard in the shape of a drum, hereinafter referred to as copy drum 30, which is adapted to support copy to be reproduced and arranged to rotate in light projection relation to the moving light-receiving surface of the xerographic plate. Uniform lighting is provided by suitable lamps 31 attached to a slotted light reflector 32 mounted adjacent to the copy drum.

A slotted light shield 33, adapted to protect the xerographic plate from extraneous light, is positioned adjacent to the surface of the xerographic plate. A slot aperture in the light shield extends transversely to the path of movement of the light-receiving surface of the xerographic drum 20 to permit reflected rays from the copy drum to be directed against a limited transverse area of the light-receiving surface as it passes thereunder.

To enable the optical system to be enclosed within a relatively small cabinet, a folder optical system including an object mirror 34, a lens 35, and an image mirror 36, is used in the preferred embodiment of the apparatus.

A document fed through document guides 37 to the copy drum is removably secured thereon by a suitable gripper mechanism for movement therewith in timed relation to the movement of the xerographic drum whereby a flowing image of the copy is projected onto the xerographic drum. The copy is held against the surface of the copy drum until gripped by means of document retaining guides 38. After the copy is scanned it is released from the copy drum to be transported out of the machine by the copy drum and document feed out rollers 42 through document feed out guide 43.

Adjacent to the exposure station is a developing station C in which there is positioned a developer apparatus 50 including a developer housing having a lower or sump portion for accumulating developer material 51. Mounted within the developer housing is a driven bucket-type conveyor 52 used to carry the developer material previously supplied to the developer housing to the upper portion of the developer housing from where the developer material is cascaded over a hopper chute 53 onto the drum.

As the developer material cascades over the drum, toner particles of the developer material adhere electrostatically to the previously formed electrostatic latent image areas on the drum to form visible xerographic powder image; the remaining developer material falling off the peripheral surface of the drum into the bottom of the developer housing. Toner particles consumed during the developing operation to form the xerographic powder images are replenished by a toner dispenser 54 mounted within the developer housing.

Positioned next adjacent to the developing station is the image transfer station D which includes suitable sheet feeding mechanism adapted to feed sheets of paper successively to the xerographic drum in coordination with the presentation of the developed image on the drum at the transfer station. The sheet feeding mechanism includes a sheet source such as paper tray 60 for a plurality of sheets of a suitable support material, that is, sheets of paper or the like, separator rollers 61 adapted to feed the top sheet of the stack of support material through a guide 67 to a sheet conveyor mechanism 62 having paper grippers 63 thereon which carry the sheet support material in to contact with the rotating xerographic drum in coordination with the appearance of a developed image at the transfer station.

The transfer of the xerographic powder image from the drum surface to the support material is effected by means of a corona transfer device 64 that is located at or immediately after the point of contact between the support material and the rotating xerographic drum. The corona transfer device 64 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the transfer material electrostatically to the drum surface and simultaneously with the tacking action, the electrostatic field is effective to attract the toner particles comprising the xerographic powder image from the drum surface and cause them to adhere electrostatically to the surface of the support material.

As the paper gripper mechanism continues to move forward in its closed circuit, it will strip the support material from the xerographic drum and carry it to a fixing device, such as, for example, heat fuser 70, whereat the developed and transferred xerographic powder image on the support material is permanently fixed thereto.

After fusing, the finished copy is preferably discharged from the apparatus at a suitable point for collection externally of the apparatus. To accomplish this, there is provided a pair of delivery rolls 65 and 66 by means of which the copy is delivered from the machine after it is released by the gripper mechanism. Suitable cam means 68 and 69 are provided at the receiving and delivery stations of the conveyor mechanism, respectively, to actuate the paper grippers at these stations to receive or discharge a sheet of support material.

The next and final station in the device is a drum cleaning station E whereat any powder remaining on the xerographic drum after the transfer step is removed and whereat the xerographic drum is flooded with light to cause dissipation of any residual electrical charge remaining on the xerographic drum.

To aid in the removal of any residual powder remaining on the xerographic drum, there is provided a corona precleaning device 84 that is substantially similar to the corona discharge device that is employed at charging station A. Removal of residual powder from the xerographic drum is effected by means of a web cleaner device 80 adapted to continuously feed a clean fibrous web material into wiping contact with the xerographic drum. As shown, the web material 55 is taken from a supply roll 81 and transported around a cleaning or pressure roll 82, preferably made of rubber, onto a take-up or rewind roll 83.

Any residual electrical charge remaining on the xerographic drum is dissipated by light from a fluorescent lamp 85 mounted in a suitable bracket above the xerographic drum, a suitable starter and ballast being provided for energizing the fluorescent lamp.

Suitable drive means drive the xerographic drum, the copy drum, the sheet conveyor mechanism at predetermined speeds relative to each other, and to effect operation of the paper separator roll, and the web cleaner mechanism, the latter being driven at a speed or speeds whereby relative movement between the xerographic drum and the web material is effected. Suitable drive means are also provided for effecting operation of the conveyor mechanism and toner dispenser of the developing apparatus assembly.

The frame for supporting the components of the apparatus is formed by front plate 10, rear plate 12 and intermediate plate 11 connected together and maintained rigidly in spaced relation to each other by suitable tie rods, not shown.

The xerographic drum is mounted on horizontal driven shaft SH1 and the drum is positioned between frame plates 10 and 11 with the major xerographic components of the machine mounted around the drum. The main drive elements and controls for the components are mounted between plates 11 and 12.

It is believed that the foregoing description is sufficient for the purposes of this application to show the general operation of a xerographic reproducing apparatus. For further details concerning the specific construction of the xerographic apparatus shown, reference is made to Eichorn et al. Patent 3,099,943 issued August 6, 1963.

*Exposure mechanism*

The exposure mechanism of the xerographic reproducing apparatus is designed to use an optical projection or scanning mechanism adapted to scan a document or copy wrapped around a rotating copy drum and to project a flowing image of the document or copy onto the photoconductive surface of the rotating xerographic drum.

As shown, the scanning mechanism includes a feeding station, a copy station, an exposure station, and means for moving the document through the copying station in synchronism with the movement of the xerographic drum.

The feeding station includes a document guide 37 extending between frame plates 10 and 11, through which a document or copy to be reproduced is moved forward into engagement with the copy drum 30 and the document stops of the document retaining guide 38, the latter orientating and holding the document in position to be gripped by the gripper fingers of the copy drum. The document retaining guide 38 and its relation to the copy drum is described in detail in Davis et al. Patent 3,100,112 issued August 6, 1963.

The copy drum 30 is fixed on shaft SH2 rotatably supported in bearings 121 and 122 mounted in frame plates 10 and 11, respectively.

Shaft SH2 is maintained in axial alignment by means of retaining rings 123 positioned in suitable grooves formed in shaft SH2 adjacent the bearings 121 and 122.

The hub 124, fixed to shaft SH2, is provided with an axial hub pin 125 adapted to extend into a suitable aperture in the right-hand end plate of the copy drum by means of which the copy drum is secured for rotation with the shaft. The copy drum is normally biased into driven engagement with the hub pin by spring 126 encircling lefthand end of shaft SH2, as seen in FIG. 2.

The peripheral surface of the copy drum 30 is provided with slots 132 and 133, parallel and in line with each other through which gripper fingers 142 extend to grip the leading edge of a document against the peripheral surface of the copy drum. The gripper fingers are secured by screws 134 to rock shaft 143 which is rotatably journaled in bearings 138, mounted in the end plates of the copy drum, in such a manner that upon rotation of the rock shaft the gripper fingers are moved in unison into and out of operative pressure relationship with the peripheral surface of the copy drum or with a document sandwiched therebetween. Axial alignment of the rock shaft is maintained by retaining rings 139 positioned in suitable grooves formed in the rock shaft.

The gripper fingers are normally biased into operative pressure relationship against the peripheral surface of the copy drum by means of a spring 144 secured at one end to a stud 145, extending from the lefthand end plate of the copy drum, as seen in FIG. 2, and connected at its other end to pin 146 etxending from lever 147 secured to the lefthand end of the rock shaft 143. A cam lever 148 is secured to the righthand end of the rock shaft in position to be engaged by an interposer pin 151 for opening the gripper mechanism to receive a document or to release a document.

The lever 147 with the pin 146 thereon is mounted on the rock shaft in a manner whereby as the rock shaft is rotated in one direction by engagement of the cam lever 148 with interposer pin 151, the lever is rotated sufficiently to permit the spring 144 to maintain the gripper fingers in an open position to receive a sheet at the receiving station of the apparatus. As the copy drum is rotated further, the cam lever 148 will engage a gripper actuator pin 152 fixed to frame plate 11 to rotate the rock shaft sufficently to throw the spring 144 over the center of the axis of the rock shaft whereby the spring will bias the gripper fingers into contact with the peripheral surface of the copy drum or with a document therebetween. As long as the gripper fingers are closed, the cam lever 148 will remain in a position out of interference relation with the gripper actuator pin during continuing rotation of the copy drum.

The interposer pin for opening the gripper mechanism is adapted to be moved manually either into position for operative engagement with the cam lever 148 on the rock shaft as the copy drum rotates, or alternatively, into an inoperative position so as to clear the cam lever for the purpose described in greater detail hereinafter. When the interposer pin 151 is in its operative position, the rock shaft is automatically actuated during each revolution of the copy drum so that a document retained by the gripper fingers is released for delivery from the machine and the gripper fingers remain open sufficiently long enough to receive a new or second document. Rotational movement of the rock shaft is limited by means of stop stud 149 secured to the lefthand end plate of the copy drum in position to be engaged by lever 147.

To permit multiple scanning of a document the interposer pin 151 is moved to the right, to the position shown in FIG. 2, out of interference relation with cam lever 148, by an operator through the manipulation of a suitable control knob, not shown. The copy drum drive and operation of the interposer pin is described in detail in the referenced copending Davis et al. Patent 3,100,112.

To effect positive removal of a document from the copy drum, there is provided a document separator, generally designated by reference character 160, which is loosely journaled on the rock shaft 143 for swinging movement outwardly to positively push a sheet from the peripheral surface of the copy drum.

The document separator 160, in the embodiment shown, is provided with spaced ejector portions 161, a central weighted portion 162 and axially extending stop pins 163, all for a purpose to be described. The spaced ejector portions 161 are provided with apertures 164 to loosely receive the rock shaft 143. The document separator is axially aligned between the two central gripper fingers 142 by means of retaining rings 165 positioned in suitable angular grooves formed in the rock shaft. With this arrangement, the ejector portions 161 of the document separator are in position to extend through the slots 133 formed in the peripheral surface of the copy drum 30.

The central weighted portion 162 of the document separator is of sufficient weight with respect to the remainder of the document separator so as to place the center of gravity of this apparatus at a point approximately as indicated by X in FIG. 3. With this arrangement, the document separator can be considered to be free swinging to normally maintain a stable orientation with respect to the axis of the rock shaft during the harmonic rise and fall of the rock shaft as the copy drum is rotated. This structure is analogous to the amusement-type Ferris wheel.

In the apparatus shown, however, the document separator is arranged in a manner whereby it is not always free swinging. As shown in the sequence of diagrams, FIGS. 5 through 8, inclusive, the document separator assumes various positions by means of the apparatus to be described.

As shown in FIG. 5, a position just prior to the release of a sheet by the gripper fingers 142, the stop pins 163 of the document separator are in a position to be engaged by the center gripper fingers 142 whereby the ejector portions are retained within the copy drum out of contact with a sheet gripped between the gripper fingers and the periphery of the copy drum. The biasing action of the spring 144 on the rock shaft is sufficient to lock the document separator in this retracted position.

Continued rotation of the copy drum to the position shown in FIG. 6, causes the gripper fingers to be opened by the interposer pin, if in operative position to engage cam lever 148, thereby releasing the document separator at which time it becomes free swinging. Since the document separator is now free swinging, it will assume the position shown in FIG. 6, whereat the ejector portions 161 extend outwardly from the peripheral surface of the copy drum to positively push a document from the peripheral surface of the copy drum.

As the copy drum continues to rotate to the position shown in FIG. 7, whereat the gripper fingers are about to close to engage a new document inserted through the document guide 37, the document separator is still free swinging and its weight will cause it to orientate itself in the position shown with the ejector portions 161 now retracted into the copy drum. As shown in FIGS. 7 and 8, free swinging of the document separator in a clockwise direction is limited by means of a document separator bar stop 166 which extends through the copy drum and is connected at opposite ends to the ends of the copy drum.

With this arrangement, the document separator can, in effect, be locked inside the copy drum out of releasing engagement with a document or sheet, to permit a document or sheet to be retained on the copy drum for successive conveying through the copying station of the apparatus.

As a document, gripped at its leading edge between the gripper fingers and the peripheral surface of the copy drum is transported thereby through the copying station, as defined by the slotted light reflector 32, successive portions of the document are uniformly illuminated by suitable lamps 31 secured to the slotted light reflector 32.

The slotted light reflector 32 is slidably supported by a support 171 extending substantially between frame plates 10 and 11. The support 171 is formed with a depending rear flange 172, a front flange 173 and a substantially C-shaped upper channel portion adapted to slidably receive the slotted light reflector 32. The support 171 is mounted between frame plates 10 and 11 by means of a pin 175 fixed to frame plate 11, the pin extending through a suitable aperture in the rear flange, and by screws 176 extending through apertures in the front flange 173 and threaded into the frame plate 10. Frame plate 10 is provided with a suitable cut-out portion to permit insertion of these elements into the machine from the frame plate 10 side of the machine, as shown in FIG. 4.

Figure 4:
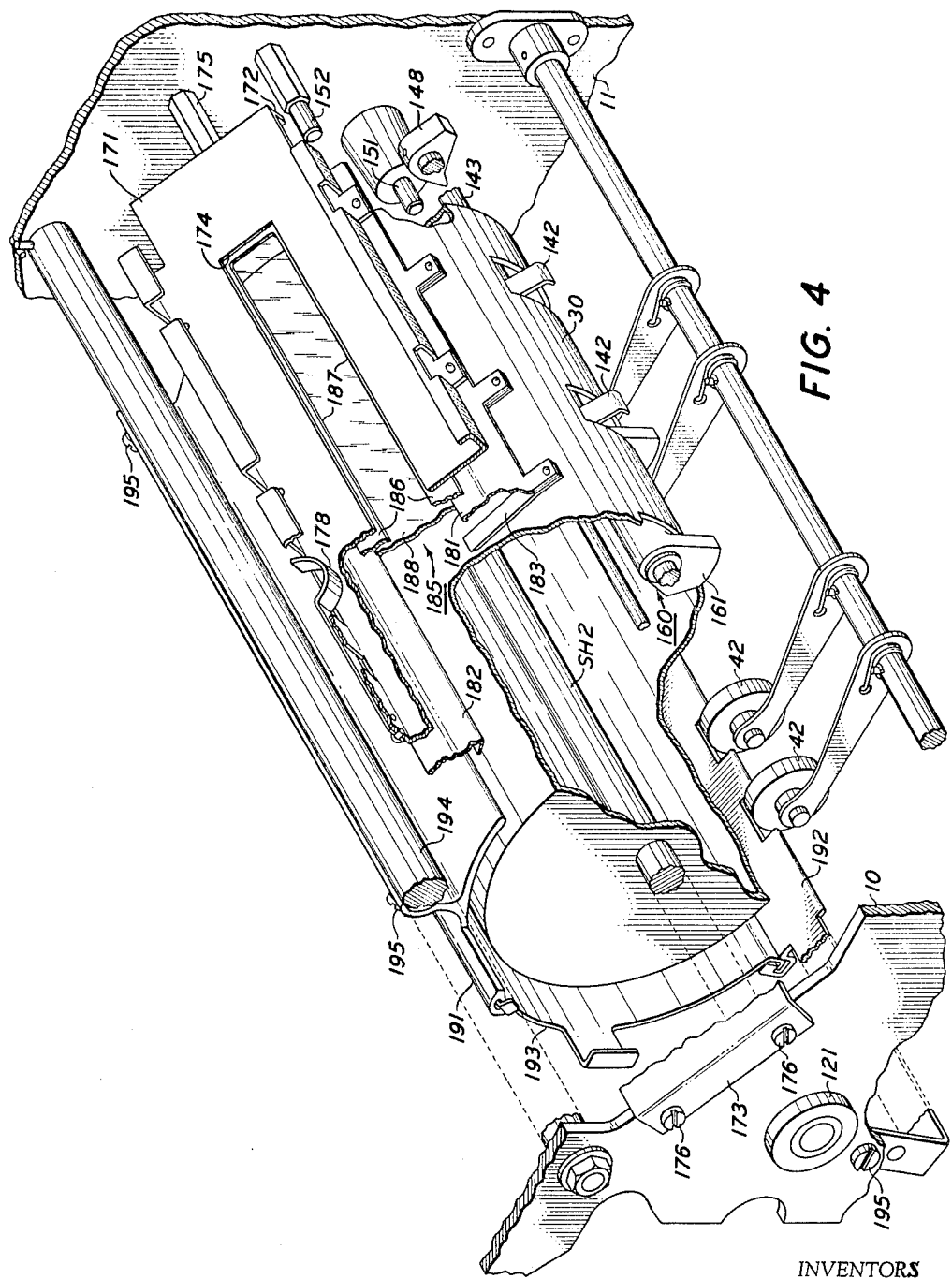
FIG. 4 is a perspective view of the copy drum.

The slotted light reflector 32 is held in position within the support, with the slot aperture in the slotted light reflector positioned over the slot aperture 174 extending across substantially the length of the support 171 by means of a leaf spring 178 secured at one end to the lefthand side of the support 171 as seen in FIG. 4. The free end of the leaf spring extends through an aperture in the side of support to engage a suitable detent, not shown, formed in the side of the slotted light reflector 32.

As shown in FIGS. 4 and 5, a support spring 181 is secured to the under side of the support 171 as by rivets, and a support spring and guide 182 is mounted to the lefthand side of the support, also by rivets. Attached to the leading edge of the support spring 181 in terms of the direction of the rotation of the copy drum with respect to the support spring, are a number of guide fingers 183 formed of spring material so that the trailing edge or free end of the guide fingers will lightly contact the peripheral surface of the copy drum or a document being advanced therebetween to retain the trailing edge of a document in surface contact with the peripheral surface of the copy drum. These guide fingers are positioned to hold a document in contact with the peripheral surface of the drum as the document is conveyed through the copying station of the apparatus.

In the event that more than one document is accidentally inserted into the machine, or in the event that a document has not been gripped by the gripper fingers 142, the extra document or the unsecured document may still be transported by the copy drum due to frictional contact of the document against the surface of the drum or a document carried thereon or because of electrostatic attraction. To ensure that such a document will be conveyed through the normal document path, there is provided a transparent document guide, generally designated 185, at the copying station to cover the aperture in the support.

The transparent document guide 185 includes a frame 186 having a narrow slot aperture 187 extending substantially across its entire length. A transparent platen 188, such as a plate of glass, is secured to the under side of the frame as by cement or tape in position to overlie the slot aperture. The frame with the glass platen is slidably secured to the slotted support by means of the support spring 181 and the support spring and guide 182. The leading edge of the support spring and guide 182 is turned backward in the direction of rotation of the copy drum to deflect the leading edge of a loose document in the normal path of travel of a document.

To further guide a loose document in a path around the copy drum, there is provided an upper curved guide 191, a lower curved guide 192 and a curved side guide 193 slidably secured in the ends of and between the upper guide and lower guide. The upper guide 191 is positioned in spaced relation with respect to the surface of the copy drum by means of a tie rod 194 to which it is secured as by screws 195. The lower guide is secured to frame plates 10 and 11 as by screws 195 extending through the depending flange portion of the lower guide.

With this arrangement, there is provided a substantially smooth copy path for a loose document, the copy path being defined by the transparent platen, the support spring and guide, the upper guide, the side guide, and the bottom guide encircling the copy drum to a point at which the feedout rollers 42 contact the copy drum.

While the invention has been described with reference to the structure disclosed herein, it is not intended to be confined to the details set forth. It is apparent that more than one document separator may be used on a document drum and it is apparent that the two ejector portions of the document separator need not be combined into a single document separator. Accordingly, this application is intended to cover such modifications or changes which may come within the purpose or the scope of the following claims:

We claim:
1. A document feed mechanism for conveying a document from a document feeding station through a copying station to a document discharge station, the document feed mechanism including
    a cylinder journaled for rotation, said cylinder having apertures in the peripheral surface thereof,
    document gripper means carried by said cylinder, said document gripper means including
    a rock shaft journaled in said cylinder and extending out from opposite sides thereof, said rock shaft being positioned parallel to the axis of rotation of said cylinder,
    gripper fingers secured at one end in spaced relation on said rock shaft and positioned to have the free end of each gripper finger extending through an aperture in the peripheral surface of the cylinder whereby the free end of the gripper fingers are in position to cooperate with the peripheral surface of said cylinder to engage the leading edge of a document,
    a lever connected to one end of said rock shaft,
    a cam lever connected to the opposite end of said rock shaft,
    spring means attached to said cylinder and connected to said lever for normally biasing said gripper fingers into cooperating relation with said cylinder,
    a document separator loosely mounted on said rock shaft for normally free swinging movement thereon, said document separator having at least one ejector thereon, said document separator being positioned adjacent to at least one of said gripper fingers whereby the free swinging movement of said document separator is restrained by the gripper finger when the gripper finger is in the closed position and whereby, when free swinging, the ejector on said document separator will extend through an aperture in the peripheral surface of the cylinder to push a document from said cylinder when released by said gripper fingers,
    means for rotating said cylinder in a path through a document feeding station, a copying station and a document discharge station,
    means to hold and align a document tangentially to said cylinder, said means being located at said document feeding station adjacent said cylinder,
    interposer means movably positioned adjacent said cylinder for movement from a first position in which said interposer means is in operative relation to said cam lever to open said gripper fingers as they are advanced through said document discharge station and to a second position in which said interposer means is out of operative relation to said cam lever, and gripper actuator means positioned adjacent said cylinder in interference relationship to said cam lever when said gripper fingers are in an open position to close said gripper fingers as they are advanced adjacent said document feeding station.

2. A document feed mechanism for conveying a document from a document feeding station through a copying station to a document discharge station, the document feed mechanism including a cylinder journaled for rotation, said cylinder having apertures in the peripheral surface thereof, a rock shaft journaled in said cylinder and extending out from opposite sides thereof, said rock shaft being positioned parallel to the axis of rotation of said cylinder, gripper fingers secured at one end in spaced relation on said rock shaft and positioned to have the free end of each gripper finger extending through an aperture in the peripheral surface of the cylinder whereby the free end of the gripper fingers are in position to cooperate with the peripheral surface of said cylinder to engage the leading edge of a document, a lever connected to one end of said rock shaft, a cam lever connected to the opposite end of said rock shaft, spring means attached to said cylinder and connected to said lever for normally biasing said gripper fingers into cooperating relation with said cylinder, a document separator loosely mounted on said rock shaft for normally free swinging movement thereon, said document separator having injector portions thereon adapted to extend through the apertures in the peripheral surface of the cylinder, said document separator being positioned adjacent to at least one of said gripper fingers whereby the free swinging movement of said document separator is restrained by the gripper finger when the gripper finger is in the closed position and whereby, when free swinging, the ejector portions of said document separator will push a document from said cylinder when released by said gripper fingers, means for rotating said cylinder in a path through a document feeding station, a copying station and a document discharge station, means to hold and align a document tangentially to said cylinder, said means being located at said document feeding station adjacent said cylinder, means positioned adjacent said cylinder to open said gripper fingers as they are advanced through said document discharge station, and gripper actuator means positioned adjacent said cylinder in interference relationship to said cam lever when said gripper fingers are in an open position to close said gripper fingers as they are advanced adjacent said document feeding station.

3. A document feed mechanism for conveying a document from a document feeding station through a copying station to a document discharge station, the document feed mechanism including a cylinder journaled for rotation, said cylinder having at least one aperture in the peripheral surface thereof, a rock shaft journaled in said cylinder and extending out from opposite sides thereof, said rock shaft being positioned parallel to the axis of rotation of said cylinder, at least one gripper finger secured at one end on said rock shaft and positioned to have the free end of the gripper finger extending through the aperture in the peripheral surface of the cylinder whereby the free end of the gripper finger is in position to cooperate with the peripheral surface of said cylinder to engage the leading edge of a document, a lever connected to one end of said rock shaft, a cam lever connected to the opposite end of said rock shaft, spring means attached to said cylinder and connected to said lever for normally biasing the gripper finger into cooperating relation with said cylinder, a document separator loosely mounted on said rock shaft for free swinging movement thereon to normally maintain a stable orientation with respect to the axis of the rock shaft during the harmonic rise and fall of the rock shaft as the cylinder is rotated, said document separator having at least one document ejector adapted to extend through the aperture in said cylinder, said document separator being positioned adjacent to at least one of said gripper fingers whereby the free swinging movement of said document separator is restrained by the gripper finger when the gripper finger is in the closed position and whereby, when free swinging, the document ejector will push a document from said cylinder when released by said gripper finger, means for rotating said cylinder in a path through a document feeding station, a copying station and a document discharge station, means to hold and align a document tangentially to said cylinder, said means being located at said document feeding station adjacent said cylinder, means positioned adjacent said cylinder to open said gripper fingers as they are advanced through said document discharge station, and gripper actuator means positioned adjacent said cylinder in interference relationship to said cam lever when said gripper fingers are in an open position to close said gripper finger as it is advanced adjacent said document feeding station.

4. A document feed mechanism for conveying a document from a document feeding station through a copying station to a document discharge station, the document feed mechanism including a cylinder journaled for rotation, said cylinder having slots in the peripheral surface thereof, a rock shaft journaled in said cylinder and extending out from opposite sides thereof, said rock shaft being positioned parallel to the axis of rotation of said cylinder, gripper fingers secured at one end in spaced relation on said rock shaft and positioned to have the free end of each gripper finger extending through a slot in the peripheral surface of the cylinder whereby the free end of the gripper fingers are in position to cooperate with the peripheral surface of said cylinder to engage the leading edge of a document, a lever connected to one end of said rock shaft, a cam lever connected to the opposite end of said rock shaft, spring means attached to said cylinder and connected to said lever for normally biasing said gripper fingers into cooperating relation with said cylinder, a document separator loosely mounted on said rock shaft for normally free swinging movement thereon, said document separator having ejector portions thereon adapted to extend through slots in the peripheral surface of the cylinder, said document separator including a weighted portion of sufficient weight with respect to the remainder of the document separator whereby the document separator will normally maintain a stable orientation with respect to the axis of the rock shaft during the harmonic rise and fall of the rock shaft as said cylinder is rotated, said document separator being positioned adjacent to at least one of said gripper fingers whereby the free swinging movement of said document separator is restrained by this gripper finger when the gripper finger is in the closed position and whereby, when free swinging, the ejector portions of said document separator will extend through the slots in the peripheral surface of the cylinder to push a document from said cylinder when released by said gripper fingers, means for rotating said cylinder in a path through a document feeding station, a copying station and a document discharge station, means to hold and align a document tangentially to said cylinder, said means being located at said document feeding station adjacent said cylinder, interposer means movably positioned adjacent said cylinder for movement from a first position in which said interposer means is in operative relation to said cam lever to open said gripper fingers as they are advanced through said document discharge station and to a second position in which said interposer means is out of operative relation to said cam lever, and gripper actuator means positioned adjacent said cylinder in interference relationship to said cam lever when said gripper fingers are in an open position to close said gripper fingers as they are advanced adjacent said document feeding station.

References Cited by the Examiner

UNITED STATES PATENTS

| | | | |
|---|---|---|---|
| 495,483 | 4/1893 | Goss | 271—71 |
| 700,239 | 5/1902 | Read | 271—71 |

M. HENSON WOOD, Jr., *Primary Examiner.*